(12) United States Patent
Maeda et al.

(10) Patent No.: US 11,433,450 B2
(45) Date of Patent: Sep. 6, 2022

(54) JOINED BODY AND METHOD FOR MANUFACTURING SAME

(71) Applicant: KOBE STEEL, LTD., Hyogo (JP)

(72) Inventors: Yasuhiro Maeda, Kobe (JP); Kenichi Watanabe, Kobe (JP); Takayuki Kimura, Kobe (JP); Toru Hashimura, Kobe (JP)

(73) Assignee: Kobe Steel, Ltd., Hyogo (JP)

( * ) Notice: Subject to any disclaimer, the term of this patent is extended or adjusted under 35 U.S.C. 154(b) by 0 days.

(21) Appl. No.: 16/955,711

(22) PCT Filed: Nov. 6, 2018

(86) PCT No.: PCT/JP2018/041102
§ 371 (c)(1),
(2) Date: Jun. 18, 2020

(87) PCT Pub. No.: WO2019/138669
PCT Pub. Date: Jul. 18, 2019

(65) Prior Publication Data
US 2020/0406333 A1    Dec. 31, 2020

(30) Foreign Application Priority Data

Jan. 11, 2018 (JP) ............................ JP2018-002824
Oct. 10, 2018 (JP) ............................ JP2018-191668

(51) Int. Cl.
*B21D 39/06* (2006.01)
*F16B 5/10* (2006.01)
(Continued)

(52) U.S. Cl.
CPC ............... *B21D 39/06* (2013.01); *F16B 5/10* (2013.01); *F16B 9/07* (2018.08); *F16B 17/006* (2013.01); *Y10T 403/4924* (2015.01)

(58) Field of Classification Search
CPC .... Y10T 403/4924; F16B 9/04; F16B 17/006; F16B 5/10; F16B 9/07; B21D 39/206; B21D 39/044; B21D 39/06
See application file for complete search history.

(56) References Cited

U.S. PATENT DOCUMENTS 3,064,707 A * 11/1962 Walts .................... B21C 37/296
                                                            72/294
6,748,788 B2 * 6/2004 Yamano .................. B21D 5/01
                                                            72/306
(Continued)

FOREIGN PATENT DOCUMENTS

DE    4334230 A1 * 1/1995 ........... B60G 15/067
EP    0634313 A1 * 1/1995 ............... F16L 3/14
(Continued)

OTHER PUBLICATIONS

The extended European search report issued by the European Patent Office dated Sep. 21, 2021, which corresponds to European Patent Application No. 18900541.6-1016 and is related to U.S. Appl. No. 16/955,711.
(Continued)

*Primary Examiner* — Matthew R McMahon
(74) *Attorney, Agent, or Firm* — Studebaker & Brackett PC

(57) ABSTRACT

A joined body includes: a first member having a pipe shape; and a second member including a wall portion having a plate shape, and a flange portion having a cylinder shape provided with an insertion hole through which the first member is inserted. In a state where the first member is inserted into the insertion hole of the flange portion of the second member, the first member and the second member are joined with the first member pipe-expanded. A material of the second member is larger than a material of the first member in a spring-back amount.

8 Claims, 13 Drawing Sheets

(51) Int. Cl.
*F16B 9/00* (2006.01)
*F16B 17/00* (2006.01)

(56) References Cited

U.S. PATENT DOCUMENTS

| | | | |
|---|---|---|---|
| 7,658,421 B2* | 2/2010 | Hashimoto | B21D 39/06 |
| | | | 293/154 |
| 8,156,630 B2* | 4/2012 | Miyazaki | F16L 23/0283 |
| | | | 29/522.1 |
| 8,266,782 B2* | 9/2012 | Miyazaki | B21D 39/06 |
| | | | 29/523 |
| 9,327,664 B2* | 5/2016 | Ishitobi | B21D 26/14 |
| 10,744,552 B2* | 8/2020 | Hashimura | B21D 39/044 |
| 10,926,314 B2* | 2/2021 | Maeda | B60R 19/04 |
| 2003/0061852 A1 | 4/2003 | Yamano et al. | |
| 2018/0015527 A1 | 1/2018 | Maeda et al. | |
| 2018/0272478 A1* | 9/2018 | Maeda | B23P 11/005 |
| 2019/0060975 A1 | 2/2019 | Hashimura et al. | |

FOREIGN PATENT DOCUMENTS

| | | | |
|---|---|---|---|
| EP | 2 006 038 A2 | 12/2008 | |
| JP | S51133170 A | 11/1976 | |
| JP | H09192760 A | 7/1997 | |
| JP | H10314869 A * | 12/1998 | B21D 39/063 |
| JP | 2009107005 A * | 5/2009 | B21D 39/06 |
| JP | 2016-079752 A | 5/2016 | |
| WO | 2017/056782 A1 | 4/2017 | |
| WO | WO-2017056899 A1 * | 4/2017 | B21D 39/06 |
| WO | WO-2018025666 A1 * | 2/2018 | B21D 39/06 |

OTHER PUBLICATIONS

International Preliminary Report on Patentability and Written Opinion issued in PCT/JP2018/041102; dated Jul. 23, 2020.

* cited by examiner

JOINED BODY AND METHOD FOR MANUFACTURING SAME

CROSS-REFERENCE TO RELATED APPLICATIONS

This is a national phase application in the United States of International Patent Application No. PCT/JP2018/041102 with an international filing date of Nov. 6, 2018, which claims priorities of Japanese Patent Applications 2018-002824 filed on Jan. 11, 2018, and No. 2018-191668 filed on Oct. 10, 2018 the contents of which are incorporated herewith by reference.

TECHNICAL FIELD

The present invention relates to a joined body and a method for manufacturing the joined body.

BACKGROUND ART

Low specific gravity and high strength metal referred to as high tension steel is used to reduce weight and improve safety of vehicles. Although the high tension steel is effective in reducing weight and improving safety, the high tension steel is heavier than lower specific gravity material such as aluminum. In addition, when high tension steel is used, the high strength causes problems such as a decrease in formability, an increase in forming load, and a decrease in dimensional accuracy. In order to solve these problems, in recent years, multi-materialization of using, in combination with steel parts, extrusion-molded products, cast products, and press-molded products that use aluminum having a lower specific gravity than steel has been performed.

The problem with multi-materialization is the joining of dissimilar metals such as steel parts and aluminum parts. Generally, it is difficult to join dissimilar metals having different properties as described above, but, for example, JP S51-133170 A and JP H9-192760 A disclose methods for joining members of enabling dissimilar metals to be joined in multi-materialization with utilizing an elastic body. Specifically, in methods for joining members of JP S51-133170 A and JP H9-192760 A, a pipe body is inserted into a hole portion of a wall surface body (plate member), an elastic body (urethane rubber member) is inserted inside the pipe body (pipe member), and the elastic body is pressed to be deformed, whereby the pipe body is expanded, and the wall surface body and the pipe body are joined together by press-fitting.

SUMMARY OF THE INVENTION

Problems to be Solved by the Invention

In the joining methods of JP S51-133170 A and JP H9-192760 A, a detailed examination on the material of the members to be joined has not been made, and there is room for improving the joining strength by examining the material.

An object of the present invention is to improve the joining strength between a first member and a second member in a joined body including the first member and the second member and a method for manufacturing the joined body.

Means for Solving the Problems

A joined body of the present invention includes: a first member having a pipe shape; and a second member including a wall portion having a plate shape, and a flange portion having a cylinder shape and provided with an insertion hole through which the first member is inserted. In a state where the first member is inserted into the insertion hole of the flange portion of the second member, the first member and the second member are joined with the first member pipe-expanded. A material of the second member is larger than a material of the first member in a spring-back amount.

According to this configuration, since the spring-back amount of the cylindrical flange portion arranged outside the first member is larger than the spring-back amount of the first member, the flange portion tightens the first member, so that the joining strength can be improved. Here, the spring-back amount means the restoration amount when the material is deformed, and the deformation may be either elastic deformation or plastic deformation.

The wall portion may include a first surface from which the flange portion protrudes, and a second surface facing the first surface. An inner circumferential surface of the flange portion may include a curved surface portion in which a portion where an inner circumferential surface of the flange portion is connected at least to the second surface of the wall portion expands toward the second surface and has a protruding shape. A curved surface portion of the flange portion may abut on an outer circumferential surface of the first member.

According to this configuration, the inner circumferential surface of the flange portion does not abut on the outer circumferential surface of the first member in the mode of line contact (point contact in the cross section in the direction in which the flange portion protrudes), but the curved surface portion having a protruding shape abuts on the outer circumferential surface of the first member in the mode of surface contact (line contact in the cross section in the direction in which the flange portion protrudes). Therefore, the contact area between the first member and the second member increases. Due to the increase in the contact area, the contact pressure between the first member and the second member when a load is applied to the joined body can be reduced, and the durability of the joined body can be improved.

For example, the inner circumferential surface of the flange portion may include: an abutting portion abutting on the outer circumferential surface of the first member on a tip side of the flange portion, and a separation portion separated from the outer circumferential surface of the first member between the curved surface portion and the abutting portion.

In addition, the curved surface portion may spread to a tip side of the flange portion. With this configuration, the area of the curved surface portion can be increased, and the contact area between the first member and the second member is further increased, whereby the durability of the joined body can be further improved.

Tensile strength of a material of the first member may be smaller than tensile strength of a material of the second member.

According to this configuration, the mechanical engineering material characteristics can define the materials of the first member and the second member. In particular, since the tensile strength is a factor that greatly affects the spring-back amount of the material, the tensile strength is significant in selecting the material from the viewpoint of the spring-back amount.

Young's modulus of a material of the first member may be larger than Young's modulus of a material of the second member.

According to this configuration, the mechanical engineering material characteristics can define the materials of the first member and the second member. In particular, since Young's modulus is a factor that greatly affects the spring-back amount of the material, Young's modulus is significant in selecting the material from the viewpoint of the spring-back amount.

A method for manufacturing a joined body of the present invention includes: preparing a first member having a pipe shape, and a second member including a wall portion having a plate shape, and a flange portion having a cylinder shape and provided with an insertion hole through which the first member is inserted, the second member made of a material having a larger spring-back amount than a material of the first member; inserting the first member into the insertion hole of the flange portion of the second member; and pipe-expanding the first member in a radial direction toward the second member to join the first member and the second member by press-fitting.

According to this manufacturing method, since the spring-back amount of the cylindrical flange portion arranged outside the first member is larger than the spring-back amount of the first member and the flange portion tightens the first member, the joining strength can be improved. In addition, the joining by pipe-expanding does not give a thermal strain as compared with the joining by welding, so that high dimensional accuracy can be secured.

Effect of the Invention

According to the present invention, in a joined body including the first member and the second member and a method for manufacturing the joined body, it is possible to improve the joining strength by defining the materials of the first member and the second member with spring-back amounts.

According to the present invention, in a joined body including the first member and the second member and a method for manufacturing the joined body, it is possible to improve the joining strength by defining the materials of the first member and the second member with spring-back amounts.

MODE FOR CARRYING OUT THE INVENTION

Hereinafter, embodiments of the present invention will be described with reference to the accompanying drawings.

First Embodiment

Figure 1:
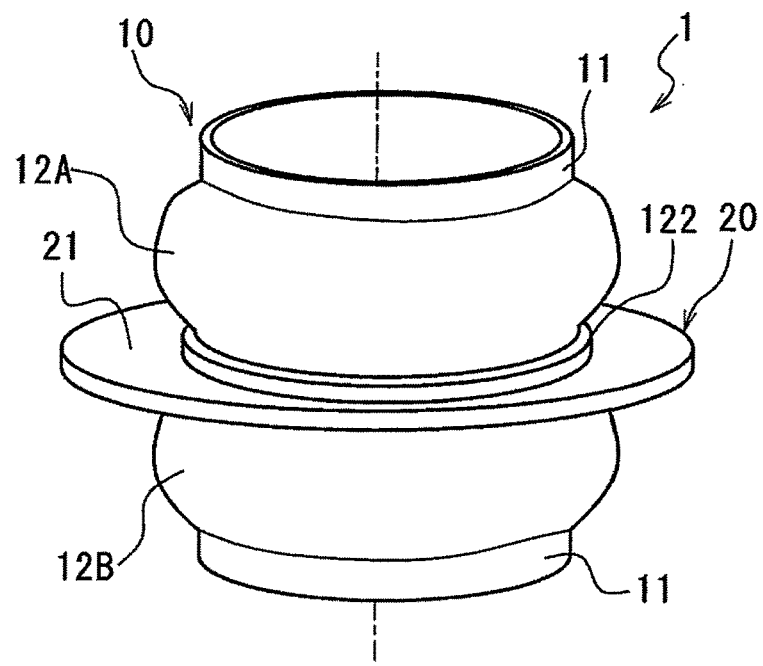
FIG. 1 is a perspective view of a joined body according to a first embodiment of the present invention.

Referring to FIG. 1, the joined body 1 of the present embodiment includes a pipe-shaped first member 10 and a plate-shaped second member 20. The joined body 1 is configured by joining the first member 10 and the second member 20.

Figure 2:
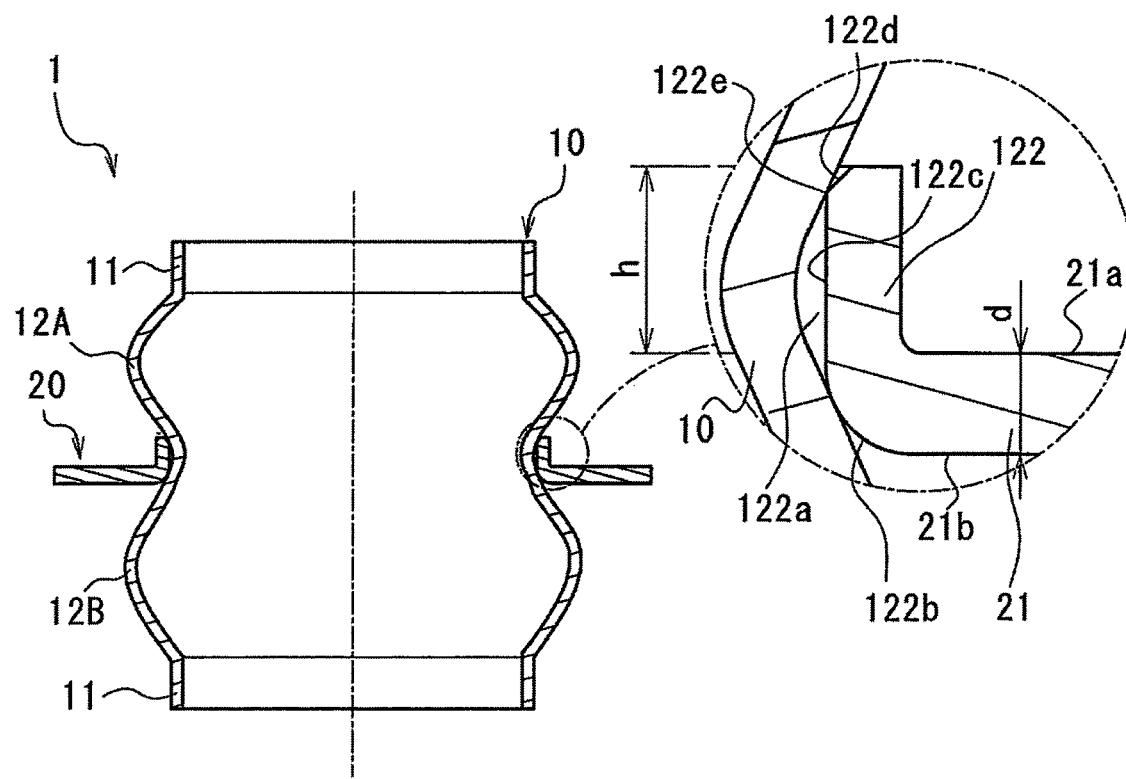
FIG. 2 is a longitudinal sectional view of the joined body according to the first embodiment.

The first member 10 of the present embodiment is a substantially circular pipe-shaped member and is made of mild steel. Referring also to FIG. 2, the first member 10 includes a circular pipe-shaped main body 11 and bulging portions 12A and 12B extending over the circumferential direction of the main body 11 and bulging radially outward. The bulging portions 12A and 12B are arranged on both sides in the axial direction (upper side and lower side in FIG. 2) of the main body 11 with respect to the second member 20.

Referring to FIG. 1, the second member 20 is a substantially annular member and is made of high tension steel. Referring also to FIG. 2, the second member 20 includes a plate-shaped lower wall (wall portion) 21, and a cylindrical flange portion 122 formed in the central portion of the lower wall 21 and extending toward one side (upper side in FIG. 2). The flange portion 122 is integrally formed with the lower wall 21 by burring and is continuous in the circumferential direction. The lower wall 21 includes an upper surface (first surface) 21a from which the flange portion 21 protrudes and a lower surface (second surface) 21b facing the upper surface 21.

The flange portion 122 includes an insertion hole 122a, through which the first member 10 is inserted, the insertion hole 122a opening at both ends. The insertion hole 122a of the flange portion 122 has a shape corresponding to the outer shape of the first member 10. Specifically, the insertion hole 122a of the flange portion 122 has a shape similar to the outer shape of the first member 10 in a cross section orthogonal to the axial direction of the flange portion 122.

The inner circumferential surface of the flange portion 122 includes a curved surface portion 122b on the base end side, that is, on the lowermost surface 21a side of the lower wall 21, and a tip portion 122d (abutting portion) separated from the outer circumferential surface of the first member 10 on the tip side.

The curved surface portion 122b is formed by making a connected portion between the inner circumferential surface of the flange portion 122 and the lower surface 21 of the lower wall 21 into a protruding shape that expands toward the lower surface 21.

The tip portion 122d extends toward one side in the axial direction and toward the outside in the radial direction of the flange portion 122. That is, at the tip portion 122d, the inner circumferential surface of the flange portion 122 expands in diameter. The tip portion 122d is formed by chamfering the inner circumferential surface of the end portion on one side of the flange portion 122 into a C-plane shape, for example.

The inner circumferential surface of the flange portion 122 includes an intermediate portion 122c (separation portion) between the curved surface portion 122b and the tip portion 122d.

In the joined body 1, the first member 10 is pipe-expanded in a state where the first member 10 is inserted into the insertion hole 122a of the second member 20, whereby the first member 10 and the second member 20 are joined together by press-fitting. In this state, the flange portion 122 of the second member 20 is fitted between the bulging portions 12A and 12B of the first member 10 and is prevented from coming off in the axial direction.

In the following, a method for manufacturing the joined body 1 according to the present embodiment will be described with reference to FIGS. 3 to 5.

Figure 3:
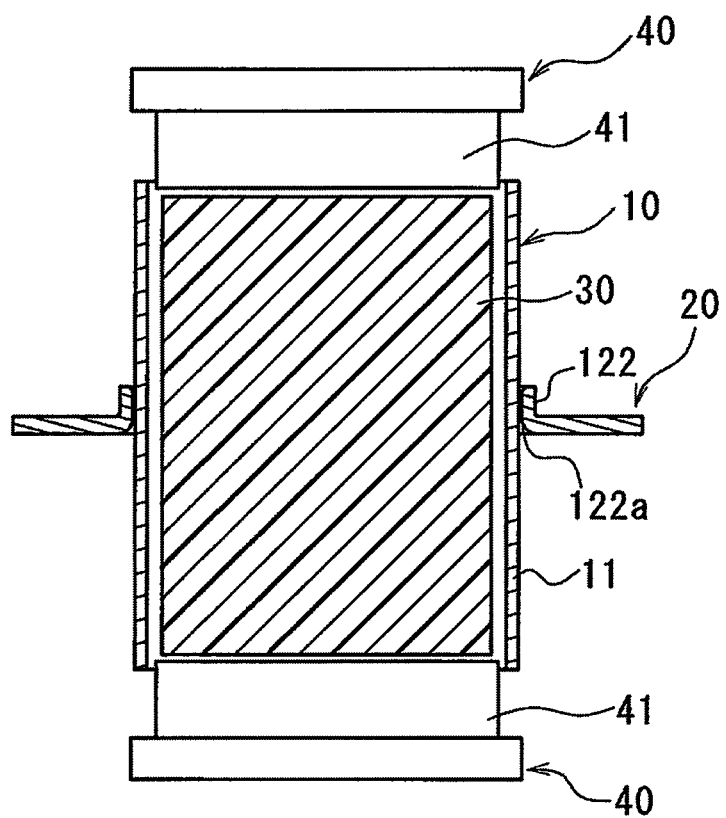
FIG. 3 is a longitudinal sectional view before joining the first member and the second member in the first embodiment.
Figure 4:
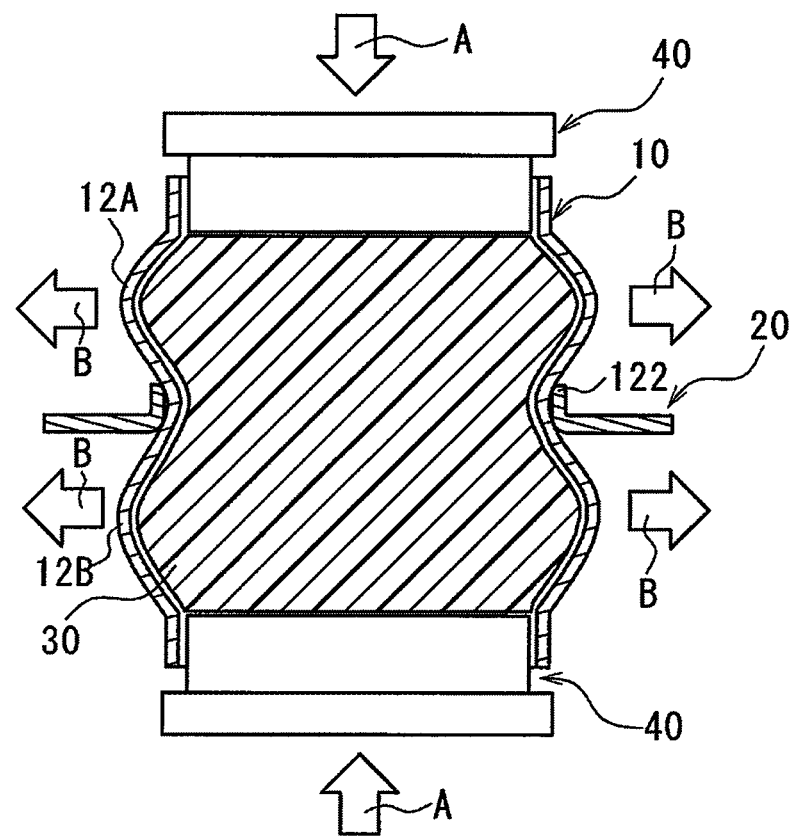
FIG. 4 is a longitudinal sectional view during joining the first member and the second member in FIG. 2.

As shown in FIG. 3, in the method for manufacturing the joined body 1 according to the present embodiment, first, the first member 10 is inserted into the insertion hole 122a of the flange portion 122 of the second member 20. In this state, the first member 10 and the second member 20 are not pipe-expanded or deformed, and the first member 10 is relatively linearly movable in the axial direction of the first member 10 with respect to the second member 20. Specifically, the first member 10 has substantially constant cross-sectional shapes orthogonal to the axial direction of the first member 10 over the entire length in the axial direction of the first member 10. The insertion hole 122a of the flange portion 122 of the second member 20 is slightly larger than the outer shape of the first member 10.

In this state, a rubber member 30 is inserted into the first member 10. Here, the order of insertion is not particularly limited. That is, the rubber member 30 may be inserted into the first member 10, and then in that state, the first member 10 may be inserted into the insertion hole 122a of the flange portion 122 of the second member 20. The rubber member 30 has a cylindrical shape and has a size insertable into the first member 10. The outer shape of the rubber member 30 is similar to the inner shape of the first member 10 in a cross section perpendicular to the axial direction of the first member 10, and is preferably as large as possible. The rubber member 30 has flat surfaces orthogonal to the axial direction of the first member 10 at both ends in the longitudinal direction. The material of the rubber member 30 is preferably any one of urethane rubber, chloroprene rubber, CNR rubber (chloroprene rubber+nitrile rubber), and silicone rubber, for example. In addition, the hardness of the rubber member 30 is preferably 30 or more in Shore A.

Next, pushers 40 are arranged at both ends of the rubber member 30. Each pusher 40 includes a pressing portion 41 that presses the rubber member 30. The pressing portion 41 has a cylindrical shape, and the end surface of the pressing portion 41 is a flat pressing surface. The pusher 40 is attached to a press device (not shown) or the like, and is driven by this press device to compress the rubber member 30 in the axial direction of the first member 10 as shown in FIG. 4 (see arrow A in FIG. 4). Along with this compression, the rubber member 30 swells toward the outside in the radial direction of the first member 10 (see arrow B in FIG. 4). The swell of the rubber member 30 pipe-expands the first member 10, and also pipe-expands the cylindrical flange portion 122 of the second member 20, so that the first member 10 and the second member 20 are joined together by press-fitting. At this time, the bulging portions 12A and 12B are formed on both sides in the axial direction of the first member 10 with respect to the second member 20.

Figure 5:
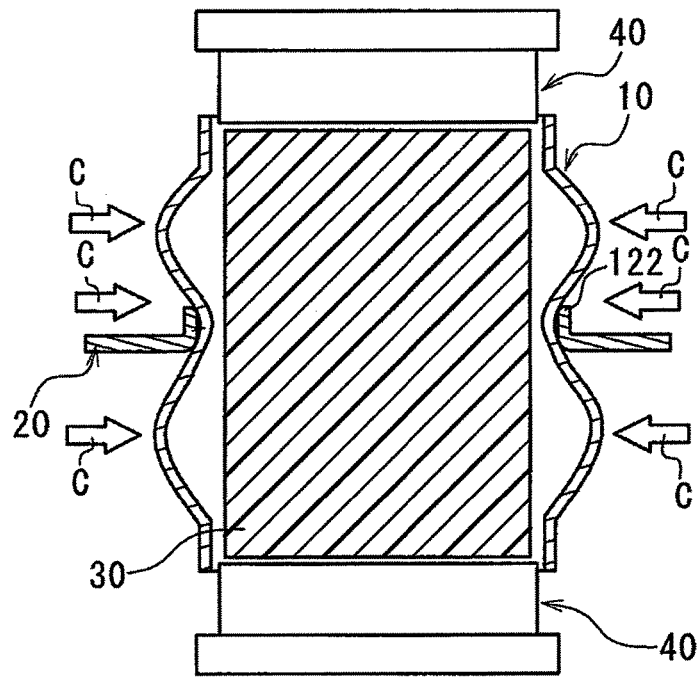
FIG. 5 is a longitudinal sectional view after joining the first member and the second member in FIG. 2.

After the first member 10 and the second member 20 are joined together by press-fitting, as shown in FIG. 5, the pressing device (not shown) is driven to release the compression of the rubber member 30 by the pusher 40. Since the rubber member 30 from which the compressive force of the pusher 40 has been removed is restored to its original shape due to the elasticity of the rubber member 30 itself, the rubber member 30 is easily removed from the first member 10. At this time, a spring-back phenomenon occurs in the first member 10 and the second member 20 from which the pipe-expanding force of the rubber member 30 has been removed. That is, the first member 10 and the second member 20 slightly pipe-contract radially inward (see arrow C in FIG. 5).

Comparing the first member 10 and the second member 20 from the viewpoint of the spring-back amount, the material of the second member 20 arranged outside (high tension steel) has a larger spring-back amount than the material of the first member 10 arranged inside (mild steel). Therefore, the second member 20 on the outer side pipe-contracts more greatly than the first member 10 on the inner side, and the second member 20 tightens the first member 10 more strongly, whereby the joining strength of the jointing by press-fitting is further improved. Here, the spring-back amount means the restoration amount when the material is deformed, and the deformation may be either plastic deformation or elastic deformation.

Figure 6:
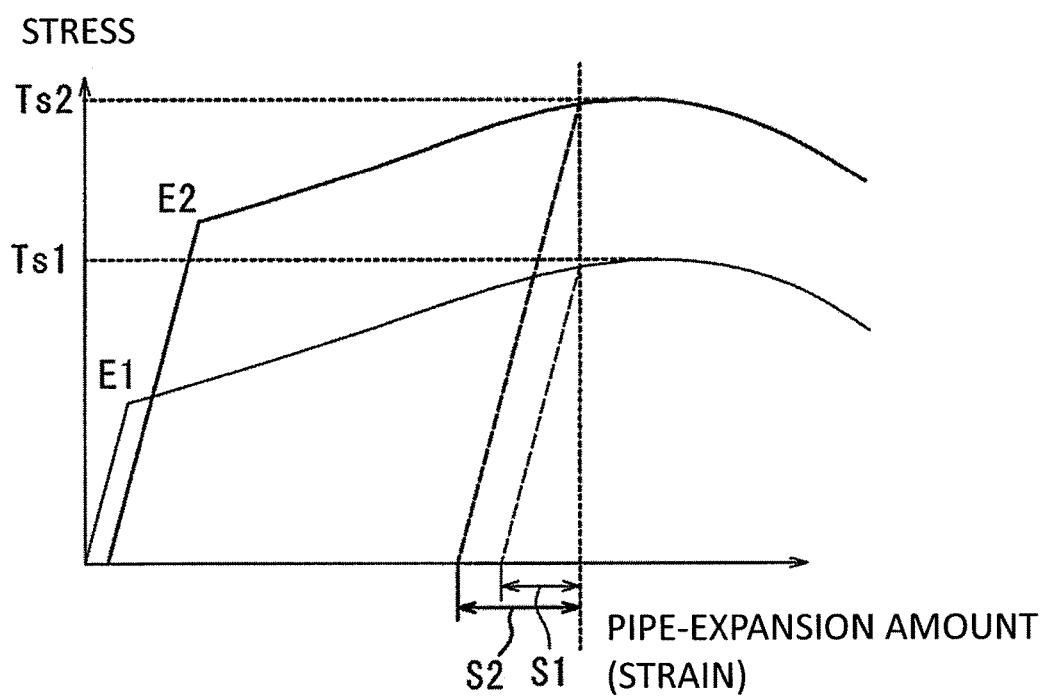
FIG. 6 is a stress-strain curve showing the spring-back amount in the first embodiment.

FIG. 6 is a stress-strain diagram showing spring-back amounts S1 and S2. The horizontal axis represents the pipe-expansion amount (strain), and the vertical axis represents the stress. The spring-back amount S1 denotes the spring-back amount of the first member 10, and the spring-back amount S2 denotes the spring-back amount of the flange portion 122 of the second member 20. The first member 10 (mild steel) and the second member 20 (high tension steel) are steel-based materials of the same kind, and as shown by the slopes of the left side straight line portions in the graph, the Young's modulus E1 of the first member 10 and the Young's modulus E2 of the second member 20 are substantially the same. In addition, the tensile strength Ts1 of the first member 10 is smaller than the tensile strength Ts2 of the second member 20. In particular, the difference between the spring-back amount S1 and the spring-back amount S2 in the present embodiment is mainly caused by the difference between the tensile strengths TS1 and Ts2. Generally, the greater the tensile strength, the greater the spring-back amount. It should be noted that the reason why the stress-strain curve of the second member 20 does not set the origin as the starting point is due to the clearance existing between the first member 10 and the second member 20. That is, this means that the first member 10 on the inner side is pipe-expanded by the amount of this clearance, and then the second member 20 is pipe-expanded. In addition, the spring back is schematically shown by the broken line in the diagram up to the position where the stress becomes zero, but actually, the stress generated between the first member 10 and the second member 20 reaches an equilibrium state and the pipe contraction is completed. In consideration of these, the spring-back amount S1 of the first member 10 is smaller than the spring-back amount S2 of the second member 20. Therefore, the flange portion 122 of the second member 20 on the outer side pipe-contracts more greatly than the first member 10 on the inner side, and the flange portion 122 of the second member 20 tightens the first member 10 more strongly, so that the joining strength of the joining by press-fitting is further improved.

According to the present embodiment, since the spring-back amount of the cylindrical flange portion 122 of the second member 20 arranged outside the first member 10 is larger than the spring-back amount of the first member 10, the flange portion 122 tightens the first member 10, so that the joining strength can be improved.

The inner circumferential surface of the flange portion 122 abuts on the outer circumferential surface of the first member 20 at the curved surface portion 122b. In addition, the inner circumferential surface of the flange portion 122 abuts on the outer circumferential surface of the first member 20 at a corner portion 122e formed by the lower end of the tip portion 122d and the upper end of the intermediate portion 122c. The intermediate portion 122c between the curved surface portion 122b and the tip portion 122d is separated from the outer circumferential surface of the first member 20.

At the curved surface portion 122b, the inner circumferential surface of the flange portion 122 abuts on the outer circumferential surface of the first member 10 in the mode of surface contact (line contact in the cross section in the direction in which the flange portion protrudes), not in the mode of line contact (point contact in the cross section in the direction in which the flange portion protrudes). Therefore, the contact area between the first member 10 and the second member 20 increases. Due to the increase in the contact area, the contact pressure between the first member and the second member when a load is applied to the joined body can be reduced, and the durability of the joined body can be improved.

In the present embodiment, in addition to the curved surface portion 122b, the corner portion 122e also abuts on the outer circumferential surface of the first member 10. However, the contribution of the abutment of this portion to the joining strength between the first member 10 and the second member is small. In addition, in the present embodiment, the protrusion amount h, from the upper surface 21a, of the lower wall 21 of the flange portion 122 is set to be larger than the dimension of the lower wall 21 in the thickness direction, but the contribution of this protrusion amount h to the joining strength between the first member 10 and the second member is small.

According to the present embodiment, the mechanical engineering material characteristics can define the materials of the first member 10 and the second member 20. In particular, since the tensile strength is a factor that greatly affects the spring-back amount of the material, the tensile strength is significant in selecting the material from the viewpoint of the spring-back amount.

In addition, as a modified example of the present embodiment, the material of the first member 10 may be high tension steel, and the material of the second member 20 may be an aluminum alloy.

Figure 7:
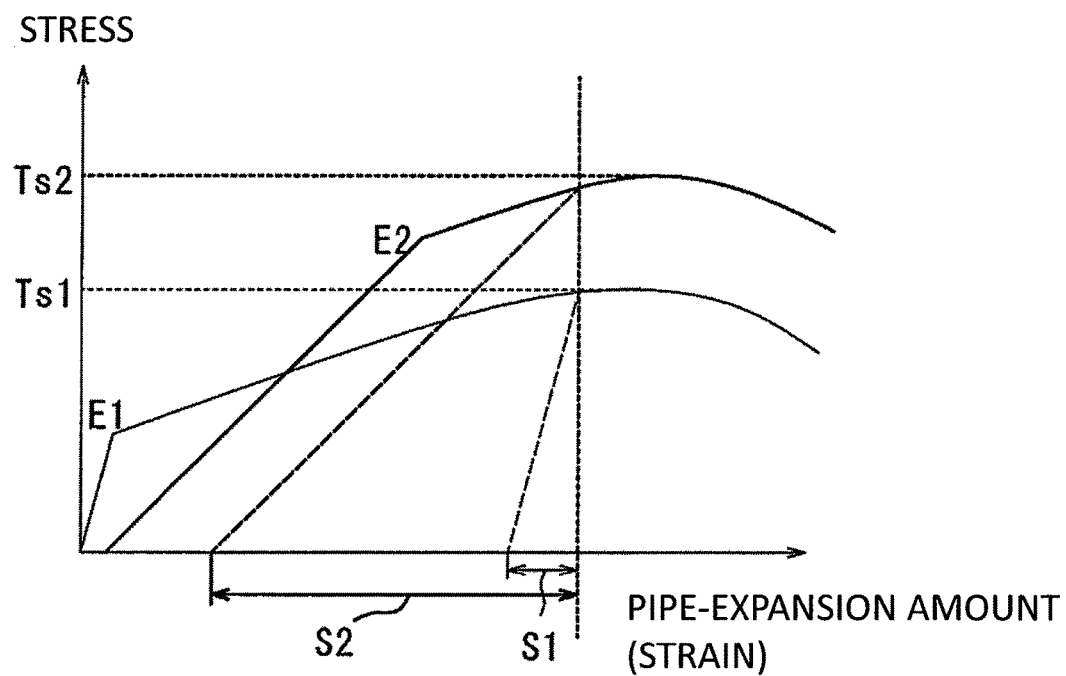
FIG. 7 is a stress-strain curve which is a modified example of the first embodiment and is similar to FIG. 6.

FIG. 7 is a stress-strain diagram showing spring-back amounts S1 and S2. The horizontal axis represents the pipe-expansion amount (strain), and the vertical axis represents the stress. The spring-back amount S1 denotes the spring-back amount of the first member 10, and the spring-back amount S2 denotes the spring-back amount of the flange portion 122 of the second member 20. As shown by the slopes of the left side straight line portions in the graph, the Young's modulus E1 of the first member 10 (high tension steel) is larger than the Young's modulus E2 of the second member 20 (aluminum alloy). In addition, the tensile strength Ts1 of the first member 10 is smaller than the tensile strength Ts2 of the second member 20. In particular, the difference between the spring-back amount S1 and the spring-back amount S2 in the present embodiment is mainly caused by the difference in Young's modulus and the difference in tensile strength. Generally, the smaller the Young's modulus, the larger the spring-back amount. In addition, as described above, generally, the greater the tensile strength, the greater the spring-back amount. In addition, the spring back is schematically shown by the broken line in the diagram up to the position where the stress becomes zero, but actually, the stress generated between the first member 10 and the second member 20 reaches an equilibrium state and the pipe contraction is completed. In consideration of these, the spring-back amount S1 of the first member 10 is smaller than the spring-back amount S2 of the second member 20. Therefore, the second member 20 on the outer side pipe-contracts more greatly than the first member 10 on the inner side, and the second member 20 tightens the first member 10 more strongly, so that the joining strength of the joining by press-fitting is further improved.

According to this modified example, specifically, the tensile strength and Young's modulus being mechanical engineering material characteristics can define the materials of the first member 10 and the second member 20. In particular, since the tensile strength and Young's modulus are factors that greatly affect the spring-back amount, the tensile strength and Young's modulus are significant in selecting the material from the viewpoint of the spring-back amount.

FIGS. 8 to 12 show various alternatives to the shape of the flange portion.

Figure 8:
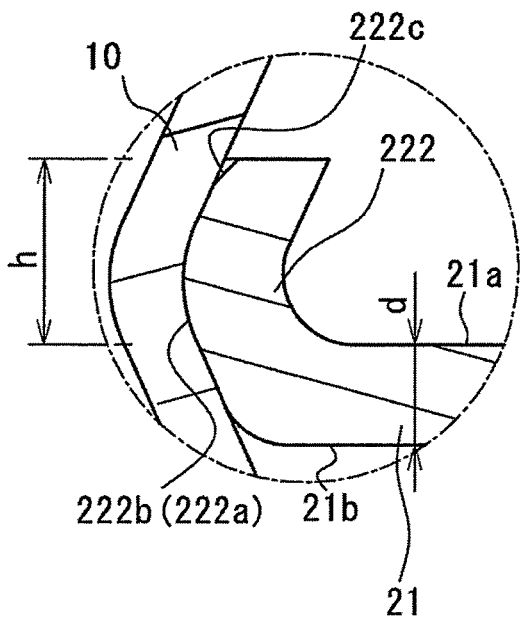
FIG. 8 is a partial sectional view of a first alternative of a flange portion.

In the alternative shown in FIG. 8, the curved surface portion 222b of the inner circumferential surface of the flange portion 222 spreads from the lower surface 21b to the tip portion 222c of the lower wall 21. In other words, in this alternative, the intermediate portion 222a of the inner circumferential surface of the flange portion 222 also constitutes the curved surface portion 222b. With this configuration, with this configuration, the area of the curved surface portion 222b can be increased, and the contact area between the first member 10 and the second member 20 is further increased, whereby the durability of the joined body can be further improved.

Figure 9:
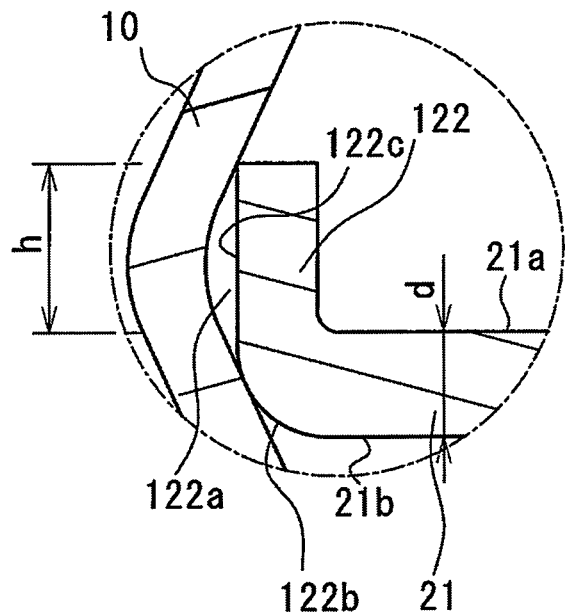
FIG. 9 is a partial sectional view of a second alternative of the flange portion.
Figure 10:
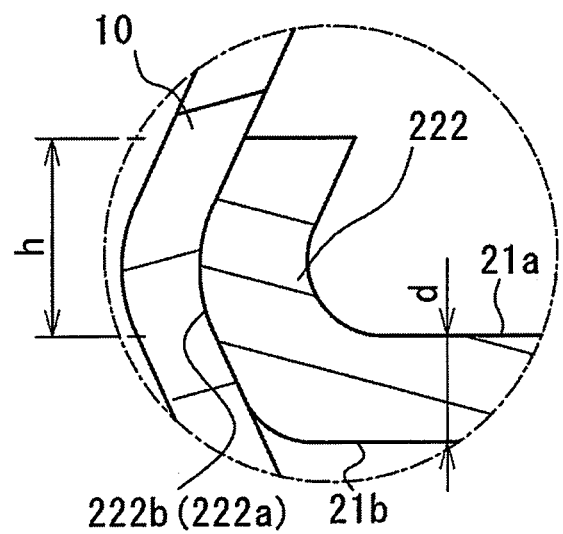
FIG. 10 is a partial sectional view of a third alternative of the flange portion.

As shown in FIG. 9, the tapered tip portion 122d may be eliminated from the flange portion 122 of the present embodiment. In addition, as shown in FIG. 10, the tapered tip portion 222d may be eliminated from the flange portion 122 of the alternative in FIG. 8.

Figure 11:
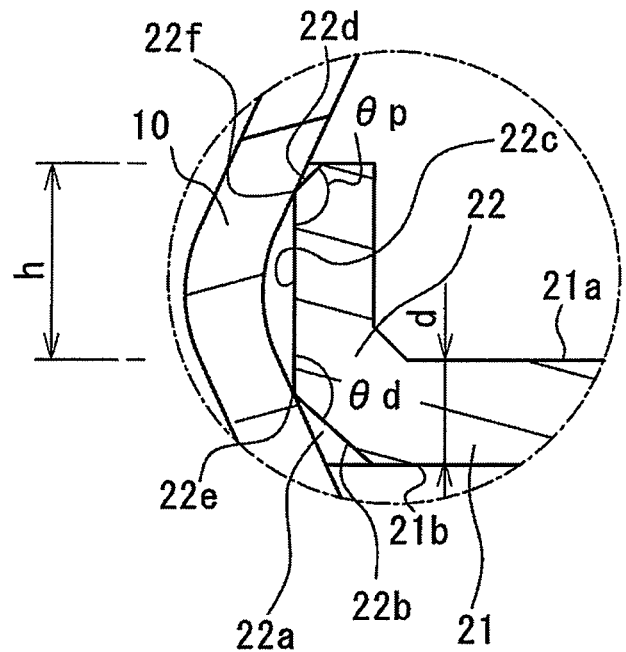
FIG. 11 is a partial sectional view of a fourth alternative of the flange portion.

In the alternative in FIG. 11, in addition, the inner circumferential surface of the flange portion 22 includes a base portion 22b connected to the lower wall 21, an intermediate portion 22c, and a tip portion 22d connected to the intermediate portion 22c.

The base portion 22b contracts in diameter upward in the drawing from the lower surface 21b side of the lower wall 21. The base portion 22b is formed by chamfering the inner circumferential surface of the flange portion 22 into a C-plane shape. The tip portion 22d of the flange portion 22 expands in diameter toward the tip of the flange portion 22. The tip portion 22d is formed by chamfering the inner circumferential surface of the flange portion 22 into a C-plane shape. The intermediate portion 22c is separated from the outer circumferential surface of the first member 20.

The inner circumferential surface of the flange portion 22 abuts on the outer circumferential surface of the first member 10 at a corner portion 22e formed between the base portion 22b and the intermediate portion 22c. In addition, the inner circumferential surface of the flange portion 22 abuts on the outer circumferential surface of the first member 10 at a corner portion 22f formed between the intermediate portion 22c and the tip portion 22d. Any of the angles θd and θp of the corners 22e and 22f is an obtuse angle, whereby, as compared with the case where these angles θd and θp are right angles, that is, the case where the base portion 22b and the tip portion 22d are not tapered, the contact pressure between the outer circumferential surface of the first member 10 and the inner circumferential surface of the flange portion 22 can be reduced.

Figure 12:
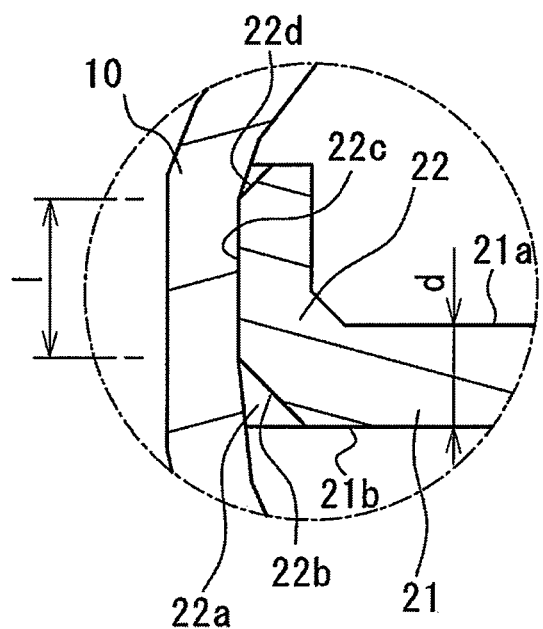
FIG. 12 is a partial sectional view of a fifth alternative of the flange portion.

The alternative in FIG. 12 is different from the alternative in FIG. 11 in that the intermediate portion 22c abuts on the outer circumferential surface of the first member 20. The dimension 1 in the axial direction of the intermediate portion 22c is larger than the dimension d in the thickness direction of the wall portion 21. Therefore, as compared with the case where the second member 20 abuts on the outer circumferential surface of the first member 10 through the inner circumferential surface of the wall portion 21, the contact area between the first member 10 and the second member 20 increases. The contact pressure between the first member 10 and the second member 20 when a load is applied to the joined body 1 can be reduced, and the durability of the joined body can be improved.

Second Embodiment

In the second embodiment described below, the same or similar elements as in the first embodiment are denoted by the same reference numerals, and detailed description thereof will be omitted. Furthermore, in the second embodiment, the same action and effect as those of the first embodiment are produced, except for the points particularly mentioned.

Figure 13:
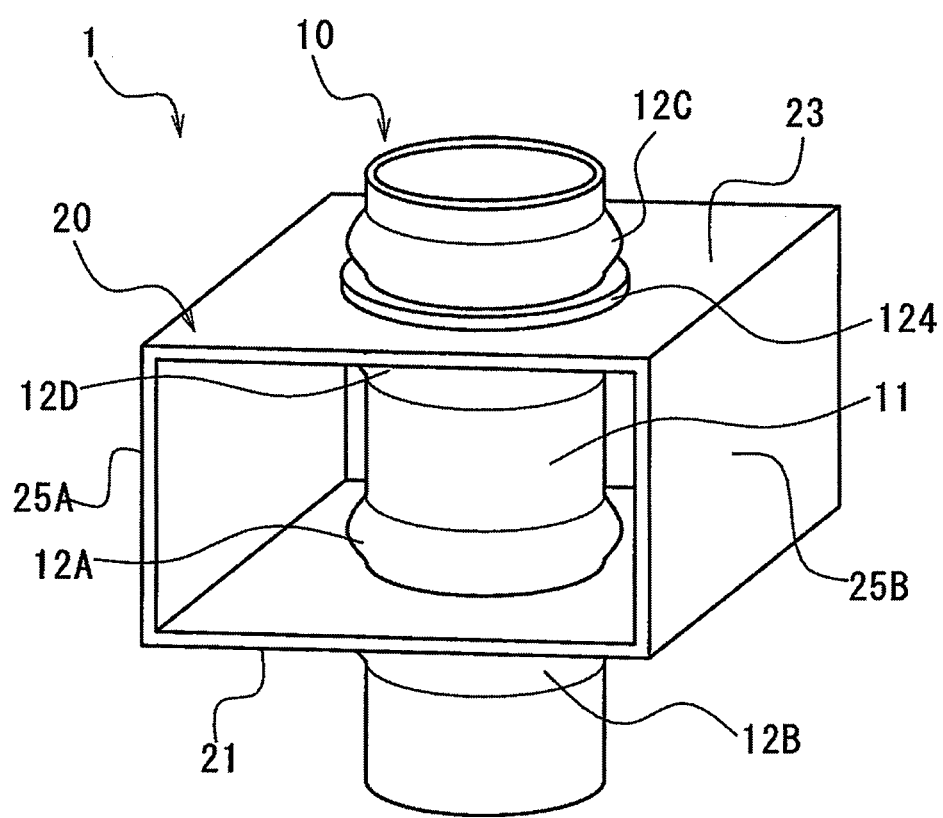
FIG. 13 is a perspective view of a joined body according to a second embodiment of the present invention.

Referring to FIG. 13, the second member 20 of the present embodiment is a hollow member, and the first member 10 and the second member 20 are joined together by press-fitting at two places.

Figure 14:
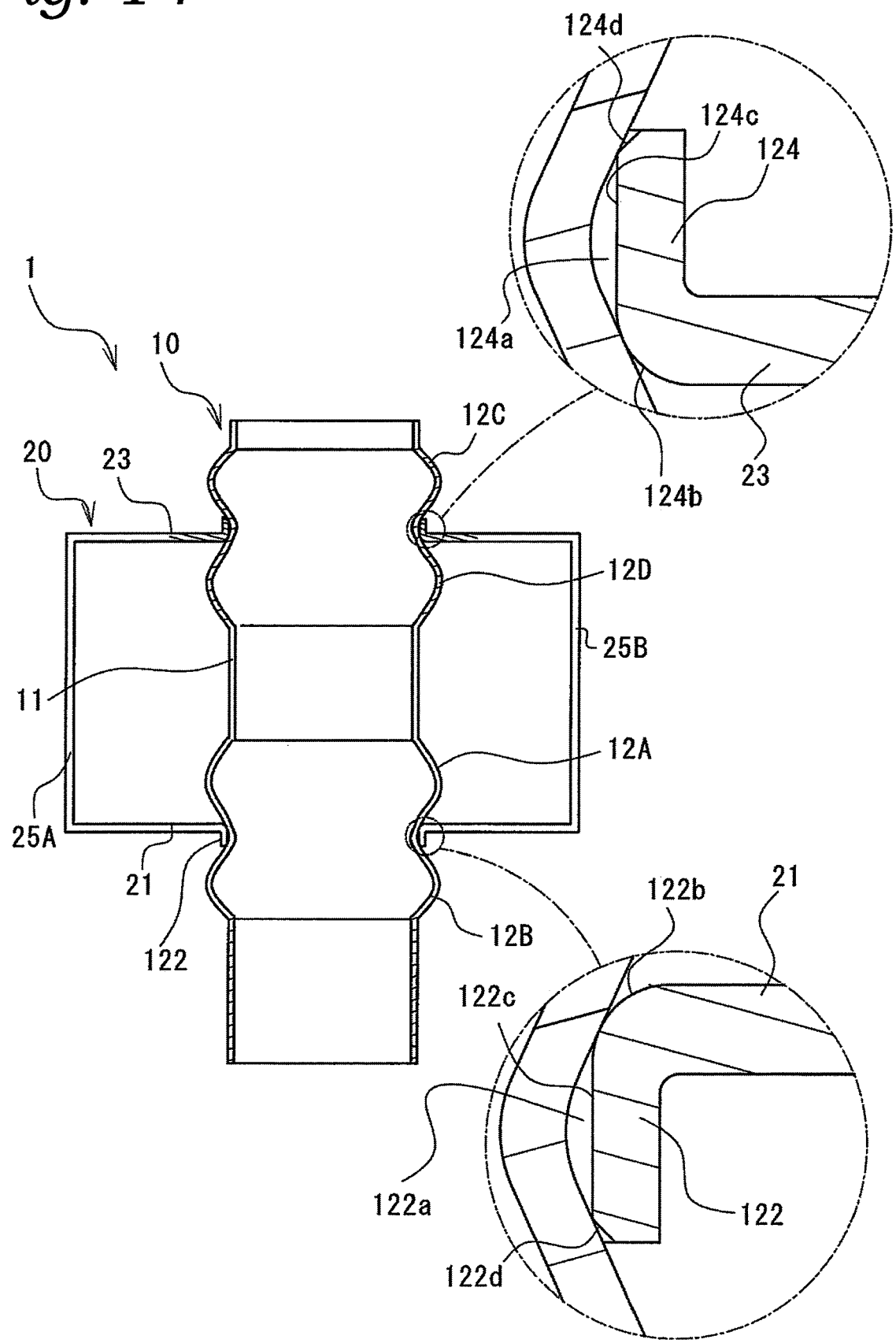
FIG. 14 is a longitudinal sectional view of the joined body according to the second embodiment.

Referring to FIGS. 13 and 14, the first member 10 of the present embodiment includes a circular pipe-shaped main body 11 and bulging portions 12A, 12B, 12C, and 12D extending over the circumferential direction of the main body 11 and bulging radially outward.

The second member 20 includes a rectangular plate-shaped lower wall 21, and a cylindrical flange portion 122 formed in the central portion of the lower wall 21 and extending toward one side (lower side in FIG. 14). In addition, the second member 20 of the present embodiment includes a rectangular plate-shaped upper wall (wall portion) 23 arranged to face the lower wall 21, and a cylindrical flange portion 124 formed in the central portion of the upper wall 23 and extending toward the other side (upper side in FIG. 14). The second member 20 includes a pair of side walls 25A and 25B mechanically connecting the end portion of the lower wall 21 and the end portion of the upper wall 23. Since the flange portion 124 of the upper wall 23 has the same configuration as the flange portion 122 of the lower wall 21, a detailed description thereof will be omitted. The flange portion 122 and the flange portion 124 of the second member 20 of the present embodiment are formed to point toward the outside of the second member 20.

In the present embodiment, the first member 10 is pipe-expanded in a state where the first member 10 is inserted into the insertion hole 122a of the flange portion 122 and the insertion hole 124a of the flange portion 124 of the second member 20, whereby the first member 10 and the second member 20 are joined together by press-fitting. The flange portion 122 of the lower wall 21 of the second member 20 is fitted between the bulging portions 12A and 12B of the first member 10, and the flange portion 124 of the upper wall 23 is fitted between the bulging portions 12C and 12D of the first member 10, whereby the first member 10 is prevented from coming off in the axial direction.

In the following, a method for manufacturing the joined body 1 according to the present embodiment will be described with reference to FIGS. 15 to 17.

Figure 15:
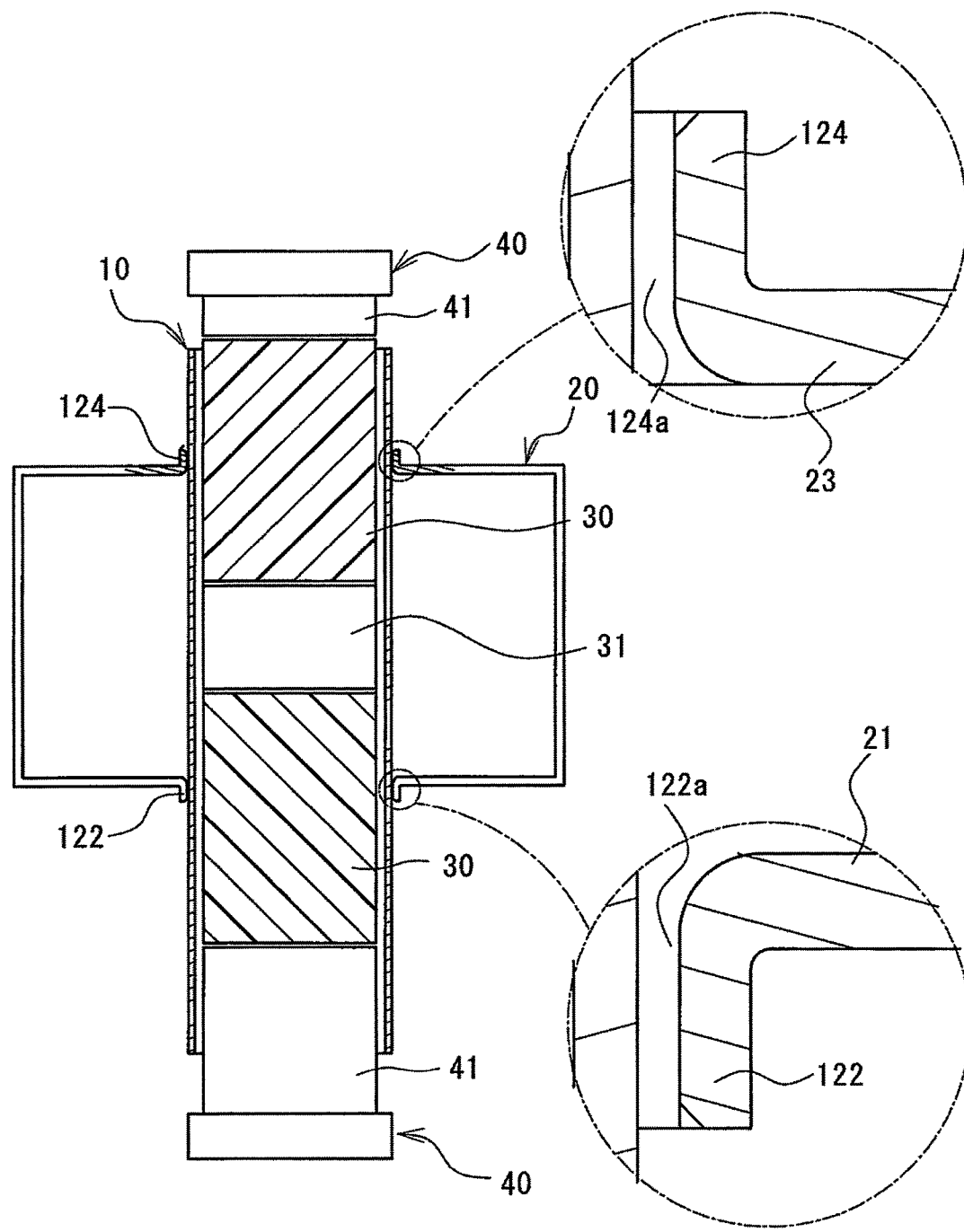
FIG. 15 is a longitudinal sectional view before joining the first member and the second member in the second embodiment.
Figure 16:
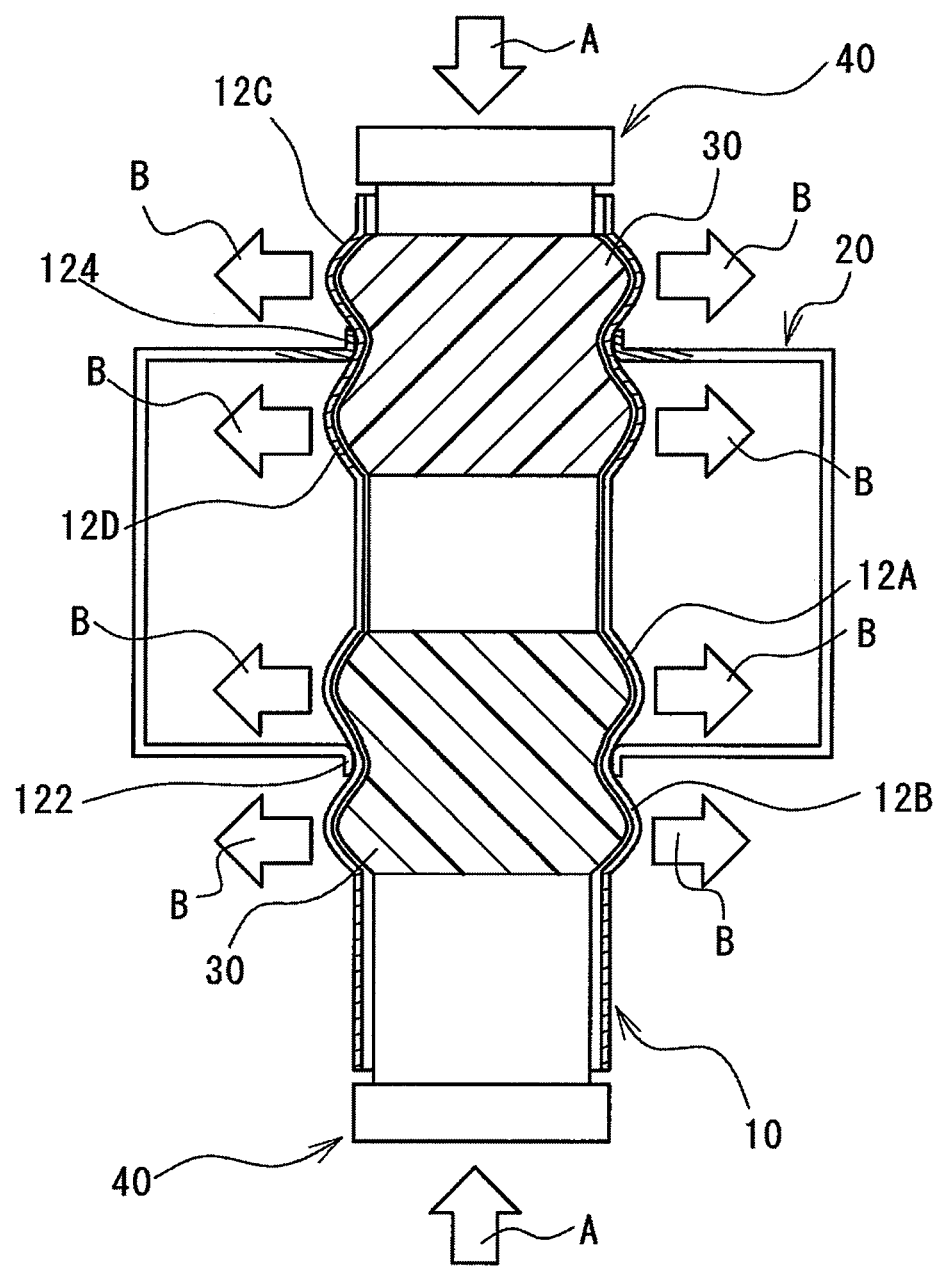
FIG. 16 is a longitudinal sectional view during joining the first member and the second member in FIG. 9.

As shown in FIG. 15, in the method for manufacturing the joined body 1 according to the present embodiment, first, the first member 10 is inserted into the insertion hole 122a of the flange portion 122 and the insertion hole 124a of the flange portion 124 of the second member 20. In this state, the first member 10 and the second member 20 are not pipe-expanded or deformed, and the first member 10 is relatively linearly movable in the axial direction of the first member 10 with respect to the second member 20. Specifically, the first member 10 has substantially constant cross-sectional shapes orthogonal to the axial direction of the first member 10 over the entire length in the axial direction of the first member 10. The insertion hole 122a of the flange portion 122 and the insertion hole 124a of the flange portion 124 of the second member 20 are slightly larger than the outer shape of the first member 10. Next, a rubber member 30 is inserted into the first member 10. Here, the order of insertion is not particularly limited. That is, the rubber member 30 may be inserted into the first member 10, and then in that state, the first member 10 may be inserted into the insertion hole 122a of the flange portion 122 and the insertion hole 124a of the flange portion 124 of the second member 20. Here, in the present embodiment, the rubber member 30 is divided into two, and a columnar plate 31 is arranged between the rubber members 30.

Next, pushers 40 are arranged on both sides across the rubber members 30. The pusher 40 is attached to a press device (not shown) or the like, and is driven by this press device to compress the rubber member 30 in the axial direction of the first member 10 as shown in FIG. 16 (see arrow A in FIG. 16). Along with this compression, the rubber member 30 swells toward the outside in the radial direction of the first member 10 (see arrow B in FIG. 16). The swell of the rubber member 30 pipe-expands the first member 10, and also pipe-expands the cylindrical flange portion 122 and flange portion 124 of the second member 20, so that the first member 10 and the second member 20 are joined together by press-fitting. At this time, bulging portions 12A and 12B are formed on both sides in the axial direction of the first member 10 with respect to the lower wall 21 of the second member 20, and bulging portions 12C and 12D are formed on both sides in the axial direction of the first member 10 with respect to the upper wall 23 of the second member 20.

Figure 17:
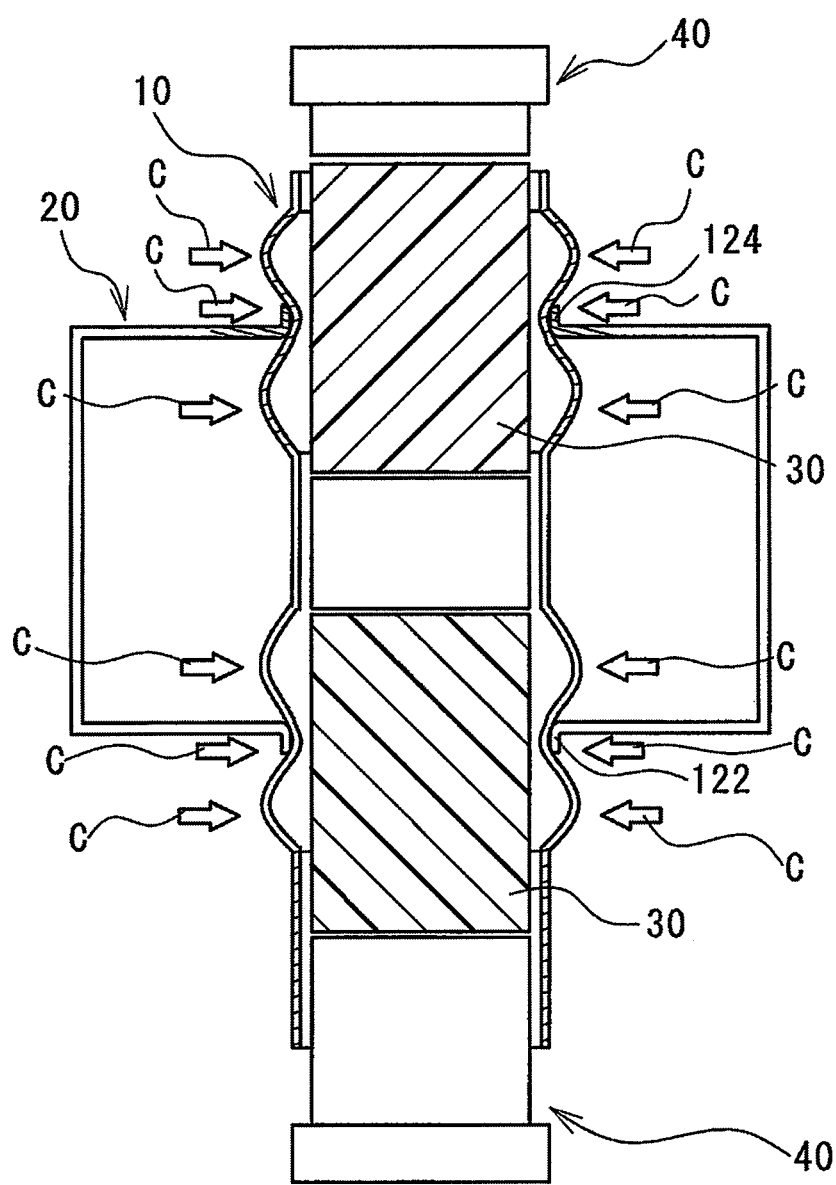
FIG. 17 is a longitudinal sectional view after joining the first member and the second member in FIG. 9.

After the first member 10 and the second member 20 are joined together by press-fitting, as shown in FIG. 17, the pressing device (not shown) is driven to release the compression of the rubber member 30 by the pusher 40. Since the rubber member 30 from which the compressive force of the pusher 40 has been removed is restored to its original shape due to the elasticity of the rubber member 30 itself, the rubber member 30 is easily removed from the first member 10. At this time, a spring-back phenomenon occurs in the first member 10 and the second member 20 from which the pipe-expanding force of the rubber member 30 has been removed. That is, the first member 10 and the second member 20 slightly pipe-contract radially inward (see arrow C in FIG. 17).

In the following, a modified example of the second embodiment will be described with reference to FIG. 18.

Figure 18:
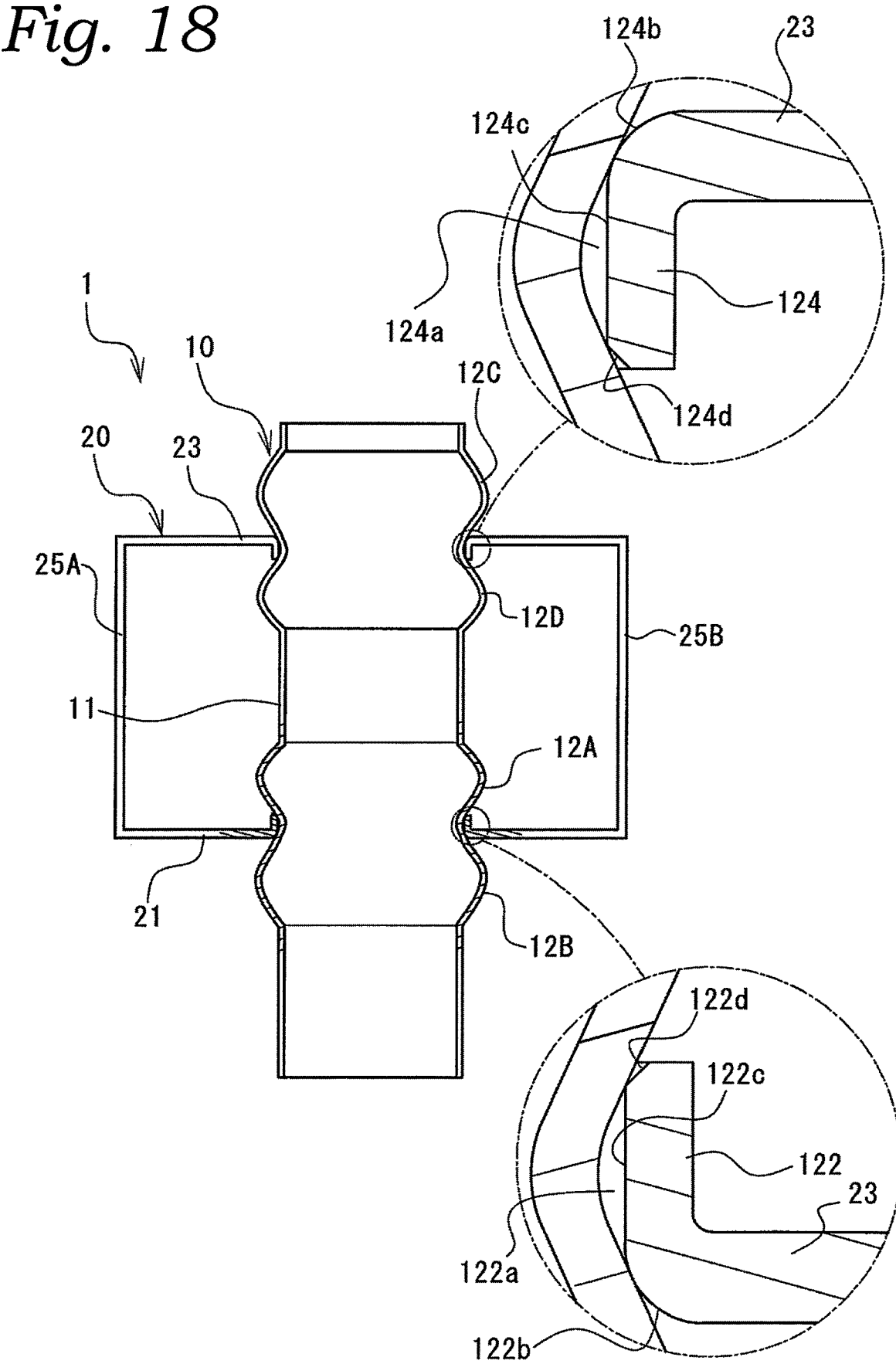
FIG. 18 is a longitudinal sectional view which is a modified example of the second embodiment and is similar to FIG. 14.

In the modified example shown in FIG. 18, the flange portion 122 and the flange portion 124 of the second member 20 are formed to point toward the inside of the second member 20. Specifically, the flange portion 122 is formed to extend from the central portion of the lower wall 21 toward one side (upper side in FIG. 18), and the flange portion 124 is formed to extend from the central portion of the upper wall 23 toward the other side (lower side in FIG. 18).

In the second embodiment and its modified example, the flange portion may have forms as the alternatives shown in FIGS. 8 to 12.

Although the present invention has been described above with the preferred embodiments, the present invention is not limited to the specific embodiments, and various modifications may be made within the scope of the gist of the present invention described in the claims.

For example, the flange portion 22, 122, or 222 has an annular cross-sectional shape in the cross section orthogonal to the axial direction of the flange portion 22, 122, or 222 in the first and second embodiments, but may have a polygonal cross-sectional shape.

In addition, the flange portion 122 does not have to be continuous in the circumferential direction.

The invention claimed is:

1. A joined body comprising:
   a first member having a pipe shape; and
   a second member including a wall portion having a plate shape, and a flange portion having a cylinder shape and provided with an insertion hole through which the first member is inserted,
   wherein in a joined state where the first member is inserted into the insertion hole of the flange portion of the second member, the first member and the second member are joined with the first member pipe-expanded,
   wherein a material of the second member has a larger spring-back amount than a material of the first member, and
   wherein an inner circumferential surface of the flange portion includes:
      a base portion connected to the wall portion;
      an abutting portion abutting on an outer circumferential surface of the first member in the joined state;
      an intermediate portion extending in an axial direction between and joining the base portion and the abutting portion; and
      a tip portion connected to the abutting portion and separated from the outer circumferential surface of the first member, the tip portion being inclined away from the abutting portion in the axial direction such that the inner circumferential surface of the flange portion expands at the tip portion, the tip portion forming a non-orthogonal inclination angle with respect to the axial direction;
   wherein the base portion of the flange portion abuts on the outer circumferential surface of the first member in the joined state; and
   wherein the tip portion is inclined away from the abutting portion and separated from the outer circumferential surface of the first member at a corner portion where the intermediate portion is joined to the abutting portion, the inner circumferential surface of the flange portion abuts on the outer circumferential surface of the first member at the corner portion in the joined state, and the inner circumferential surface of the flange portion does not abut on the outer circumferential surface of the first member at the tip portion in the joined state.

2. The joined body according to claim 1, wherein a dimension in the axial direction of the abutting portion is larger than a dimension in a thickness direction of the wall portion.

3. The joined body according to claim 1,
   wherein the wall portion includes a first surface from which the flange portion protrudes, and a second surface facing the first surface,
   wherein the inner circumferential surface of the flange portion includes a curved surface portion where the inner circumferential surface of the flange portion is connected at least to the second surface of the wall portion and expands toward the second surface, and
   wherein the curved surface portion of the flange portion abuts on the outer circumferential surface of the first member in the joined state.

4. The joined body according to claim 3, wherein:
   the abutting portion of the inner circumferential surface of the flange portion abuts on the outer circumferential surface of the first member on a tip side of the flange portion; and
   the intermediate portion includes a separation portion separated from the outer circumferential surface of the first member between the curved surface portion and the abutting portion.

5. The joined body according to claim 3, wherein the curved surface portion spreads to a tip side of the flange portion.

6. The joined body according to claim 1, wherein tensile strength of a material of the first member is smaller than tensile strength of a material of the second member.

7. The joined body according to claim 1, wherein Young's modulus of a material of the first member is larger than Young's modulus of a material of the second member.

8. A method for manufacturing a joined body according to claim 1, comprising:
   preparing the first member having a pipe shape, and the second member including the wall portion having a plate shape, and the flange portion having a cylinder shape and provided with the insertion hole through which the first member is inserted, the second member made of a material having a larger spring-back amount than a material of the first member;
   inserting the first member into the insertion hole of the flange portion of the second member; and
   pipe-expanding the first member in a radial direction toward the second member to join the first member and the second member by press-fitting.

* * * * *